United States Patent
Hamabe

(10) Patent No.: US 7,200,403 B2
(45) Date of Patent: Apr. 3, 2007

(54) COMMUNICATION CONTROL METHOD IN MOBILE COMMUNICATION SYSTEM AND BASED STATION USED THEREFOR

(75) Inventor: Kojiro Hamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 261 days.

(21) Appl. No.: 10/862,311

(22) Filed: Jun. 8, 2004

(65) Prior Publication Data

US 2004/0224692 A1    Nov. 11, 2004

Related U.S. Application Data

(62) Division of application No. 10/083,486, filed on Feb. 27, 2002, now Pat. No. 6,771,965.

(30) Foreign Application Priority Data

Feb. 28, 2001  (JP)  ............................. 2001/053451
May 18, 2001  (JP)  ............................. 2001/148565

(51) Int. Cl.
*H04Q 7/20*    (2006.01)

(52) U.S. Cl. ...................... 455/442; 455/439; 455/436; 370/331; 370/332

(58) Field of Classification Search ................ 455/442, 455/439, 436, 552; 370/331, 332
See application file for complete search history.

(56) References Cited

U.S. PATENT DOCUMENTS 6,400,929 B1   6/2002   Ue et al.

(Continued)

FOREIGN PATENT DOCUMENTS

JP             10-22975           1/1998

(Continued)

OTHER PUBLICATIONS

3GPP "3rd Generation Partnership Project; Technical Specification Group Radio Access Network; Physical channels and mapping of transport channels onto physical channels (FDD)", (3G TS 25.211 version 3.0.0), (Oct. 1999).

(Continued)

*Primary Examiner*—Danh Cong Le
(74) *Attorney, Agent, or Firm*—McGinn IP Law Group, PLLC

(57) ABSTRACT

In the case where a PDSCH is transmitted by only one specific base station and a DPCH is simultaneously transmitted by a plurality of base stations while controlling a transmitting power of the PDSCH according to the DPCH, an optimum value of a power ratio between the PDSCH and the DPCH according to a position of a mobile station is optimized, and the receiving quality of the PDSCH at a fixed level regardless of the position of the mobile station on the soft handover is maintained to be constant. In a specific base station, a value of a ratio between the transmitting power of the PDSCH and that of the DPCH that is a dedicated channel is controlled to be optimized according to the position of the mobile station on the soft handover so that it becomes the ratio determined based on a measured value of a received power of a shared channel or the dedicated channel of a soft handover base station in the mobile station. To be more specific, the mobile station notifies the specific base station of these measuring results, and the specific base station notified thereof multiplies by a coefficient determined based thereon the transmitting power of the DPCH that is the dedicated channel transmitted by the base station itself and transmits it.

8 Claims, 10 Drawing Sheets

U.S. PATENT DOCUMENTS

| | | | |
|---|---|---|---|
| 6,405,021 B1 | 6/2002 | Hamabe | |
| 6,600,933 B1 * | 7/2003 | Hiramatsu et al. | 455/561 |
| 6,628,958 B1 * | 9/2003 | Kamel et al. | 455/522 |
| 6,643,520 B1 | 11/2003 | Park et al. | |
| 6,650,872 B1 | 11/2003 | Karlsson | |
| 6,816,717 B1 * | 11/2004 | Sipila | 455/277.2 |
| 7,006,841 B2 * | 2/2006 | Monogioudis et al. | 455/522 |
| 7,024,186 B1 * | 4/2006 | Ishikawa et al. | 455/423 |

FOREIGN PATENT DOCUMENTS

| | | |
|---|---|---|
| JP | 11-313356 | 11/1999 |
| JP | 2002-198903 | 7/2002 |
| JP | 2002-290327 | 10/2002 |
| WO | WO 99/46946 | 9/1999 |

OTHER PUBLICATIONS

3GPP "3rd Generation Partnership Project; Technical Specification Group Radio Access Network; DSCH power control improvement in soft handover (Release4)", 3GPP TR 25.841 V4.0.0, (Dec. 2000).
Japanese Office Action dated Aug. 5, 2003 with Partial English translation.

* cited by examiner

FIG. 4
UPLINK DPCH
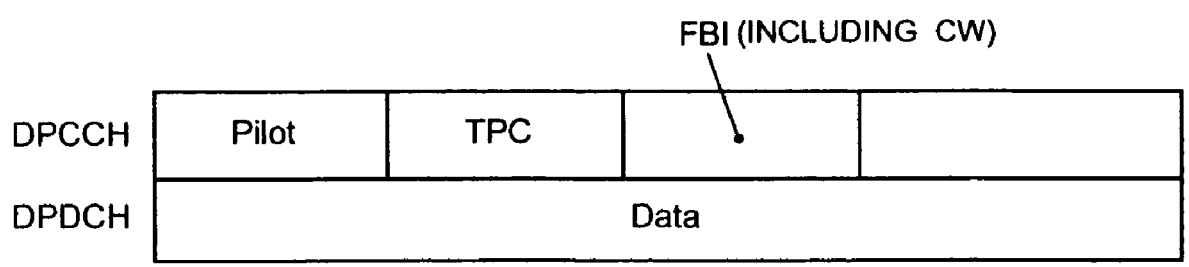
DOWNLINK DPCH
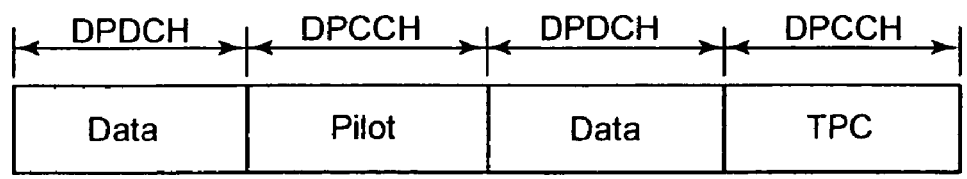

COMMUNICATION CONTROL METHOD IN MOBILE COMMUNICATION SYSTEM AND BASED STATION USED THEREFOR

The present Application is a Divisional Application of U.S. patent application Ser. No. 10/083,486 filed on Feb. 27, 2002 now U.S. Pat. No. 6,771,965.

BACKGROUND OF THE INVENTION

1. Field of the Invention

The present invention relates to a communication control method in a mobile communication system and a base station and a program record medium used therefor, and in particular, to the communication control method of a channel from the base station to a mobile station on soft handover in a CDMA (Code Portion Multiple Access) cellular mobile radio communication system.

2. Description of the Prior Art

One of the cellular mobile communication systems is an HSDPA (High Speed Downlink Packet Access) mode, which is a technology for transmitting packeted data by using a high-speed downlink shared channel (downlink-specific) called HS-PDSCH (High Speed-Physical Downlink Shared Channel) in the case of transmitting to a mobile station large amounts of data (such as the data of a static image and a dynamic image) from a communication network via a base station. It is a mode wherein, in the case where the large amounts of data must be simultaneously transmitted to a plurality of mobile stations, this high-speed downlink shared channel called HS-PDSCH is shared time-wise (time sharing) to use this one high-speed channel by sharing.

When the mobile station approaches a boundary of a cell in such a cellular mobile communication system in the HSDPA mode, the mobile station is in a state capable of communication by setting up channels with a plurality of base stations having the cells near this boundary as their service areas, which is called a soft handover state. At the time of this soft handover, for example, channels are connected between a certain mobile station (MS) 10 and two base stations (BS) 1 and 2 as shown in FIG. 1.

As for these channels, there are two types as shown in FIG. 1, where one type is a downlink-specific common pilot channel called CPICH (Common Pilot Channel), indicated as a CPICH 1 and a CPICH 2 corresponding to the base stations 1 and 2 respectively. In addition, the other type is a dedicated (physical) channel for uplink/downlink called DPCH (Dedicated Physical Channel) and includes various communication data such as control information and voice. It is also indicated as a DPCH 1 and a DPCH 2 corresponding to the base stations 1 and 2 in FIG. 1. Moreover, in FIG. 1, a PDSCH is the above-mentioned large-capacity data channel, which is a downlink-specific shared data channel.

Moreover, definitions of such various channels are disclosed in the 3GPP (3rd Generation Partnership Project) Specifications TS25.211V3.0.0 (1999-10).

It adopts a method wherein, on the soft handover, a plurality of base stations 1 and 2 simultaneously transmit the DPCH to a mobile station 10, and the PDSCH that is the data channel is transmitted by just one base station (only the base stations 1 in FIG. 1) so as to control transmitting power of this PDSCH in accordance with the DPCH, which is disclosed in the 3GPP Report TR25.841V4.0.0 (2000-12).

According to this report, transmitting power $P_{PDSCH}$ from the base station of the PDSCH is determined as follows.

$$P_{PDSCH} = P_{DPCH1} \cdot A \cdot C \quad (1)$$

Here, the transmitting power of the DPCH1 is $P_{DPCH1}$, and A is a constant and selected as A=1 for instance. And C is defined as follows.

$$P_{CPICH1} > P_{CPICH2}$$

In this case, $C = C_{primary}$ (=2 to 3 dB), and if $$P_{CPICH1} < P_{CPICH2},$$

it is $C = C_{non\text{-}primary}$ (=4 to 6 dB). In addition, $P_{CPICH1}$ and $P_{CPICH2}$ are the received power of the CPICH 1 and CPICH 2 in the mobile station.

In another mobile communication system for performing data communication from the base station to the mobile station by using the PDSCH, the transmitting power of this PDSCH is not controlled but is fixed, and instead, it is possible to select a plurality of transmission modes of different modulating methods or encoding methods. As for the modulating methods, there are QPSK (Quadrature Phase Shift Keying) capable of transmitting 2 bits (4 values) by 1 symbol, 16QAM (16 Quadrature Amplitude Modulation) capable of transmitting 4 bits (16 values) by 1 symbol, 64QAM (64 Quadrature Amplitude Modulation) capable of transmitting 6 bits (64 values) by 1 symbol and so on. In addition, as for the encoding methods, there are convolutional encoding of an encoding ratio 1/2 for performing encoding by 2 bits per information bit, the convolutional encoding of an encoding ratio 1/2 for performing encoding by 3 bits per information bit and so on.

FIG. 11 shows an example of selection of the transmission modes of different modulating methods. In FIG. 11, for instance, the transmission mode is selected so that, a distant from a base station 51 to a mobile station 52 is shorter, a transmitting speed becomes to be faster. To be more specific, the base station 51 selects the transmission modes of 64QAM, 16QAM and QPSK in increasing order of distance to the mobile station 52.

While the DPCH is used together with the PDSCH in order to transmit and receive control information on the data transmission by the PDSCH, there is a method in the past, as that of selecting the above-mentioned transmission modes of 64QAM, 16QAM and QPSK, wherein a range of the transmitting power in the base station of the DPCH of the downlink is determined in advance so as to select the transmission mode according to that transmitting power.

In this case, the mobile station measures receiving quality of the DPCH from the base station, compares the measured value to a reference value, and notifies the base station of increase or decrease in the transmitting power of the DPCH so that the measured value becomes close to the reference value. The base station increases or decreases the transmitting power of the DPCH according to that notification, and also selects the transmission mode according to the transmitting power set up by the increase or decrease. For instance, as shown in FIG. 12, it selects the transmission modes of the 64QAM, 16QAM and QPSK in increasing order of the transmitting power to be set up.

As for the method of determining the transmitting power of the PDSCH shown in the above-mentioned equation (1), it is a two-step control method wherein the transmitting power of the PDSCH is determined by rendering the C of the equation (1) as $C_{primary}$ if, of a plurality of base stations in the soft handover state, the base station setting up the PDSCH is one having higher received power of the CPICH in the mobile station (Primary), and by rendering the C as $C_{non\text{-}primary}$ otherwise, resulting in a problem that continuous and elaborate control cannot be exerted. To be more specific, there is a fault that it is not possible to maintain the receiving quality of the PDSCH at a fixed level regardless of a position of the mobile station 10 on the soft handover.

SUMMARY OF THE INVENTION

An object of the present invention is to provide the communication control method in the mobile communication system and the base station and a record medium used therefor, wherein, in the case where the PDSCH is transmitted by one specific base station and the DPCH is simultaneously transmitted by the plurality of base stations while controlling the transmitting power of the PDSCH according to the DPCH, an optimum value of a power ratio between the PDSCH and the DPCH is optimized according to the position of the mobile station, and thus it is possible to maintain the receiving quality of the PDSCH at a fixed level regardless of the position of the mobile station on the soft handover.

In addition, as for the above-mentioned method of selecting the transmission mode, the PDSCH that is the data channel is transmitted by just one base station, while the transmitting power of the DPCH in the base stations is controlled, on the soft handover when the plurality of base stations simultaneously transmit the DPCH to the mobile station, by the receiving quality generated by synthesizing the received DPCH transmitted from the plurality of base stations in the mobile station, resulting in a value different from the transmitting power in the case where only one base station transmits the DPCH, so that there is a fault that it is not possible to adequately select the transmission mode of the PDSCH and maintain the receiving quality of the PDSCH at a fixed level.

Another object of the present invention is to provide the communication control method in the mobile communication system and the base station and the program record medium used therefor, wherein, in the case where the PDSCH is transmitted by one specific base station and the DPCH is simultaneously transmitted by the plurality of base stations while controlling the transmission mode of the PDSCH according to the transmitting power of the DPCH, the transmission mode of the PDSCH is controlled according to the position of the mobile station, and thus it is possible to maintain the receiving quality of the PDSCH at a fixed level regardless of the position of the mobile station on the soft handover.

According to the present invention, it is possible to acquire a communication control method in a mobile communication system wherein a mobile station and a plurality of base stations in a soft handover state with this mobile station setting up a dedicated channel to the above described mobile station and informing a common pilot channel are included, and only a specific base station of the plurality of base stations in the soft handover state has a shared channel with the above described mobile station set up, the above described method characterized by, in the above described mobile station, measuring received power of the above described dedicated channel or common pilot channel transmitted from each of the above described plurality of base stations and notifying the above described specific base station of this measuring results information, and in the above described specific base station, controlling data transmission of the above described shared channel based on transmitting power of the above described dedicated channel and the above described measuring results information, the above described controlling performed according to a ratio between a sum of the above described received power and the received power from the above described specific base station.

According to the present invention, it is possible to acquire the communication control method in the mobile communication system wherein the mobile station and the plurality of base stations in the soft handover state with this mobile station setting up the dedicated channel to the above described mobile station and informing the common pilot channel are included, and only the specific base station of the plurality of base stations in the soft handover state has the shared channel with the above described mobile station set up, the above described method characterized by, in the above described mobile station, measuring the received power of the above described dedicated channel or common pilot channel transmitted from each of the above described plurality of base stations and notifying the above described specific base station of this measuring results information, and in the above described specific base station, performing the data transmission of the above described shared channel by the power determined based on the above described measuring results information and the transmitting power of the above described dedicated channel, and the above described determined power being a value according to the ratio between the sum of the above described received power and the received power from the above described specific base station.

According to the present invention, it is possible to acquire the communication control method in the mobile communication system wherein the mobile station and the plurality of base stations in the soft handover state with this mobile station setting up the dedicated channel to the above described mobile station and informing the common pilot channel are included, and only the specific base station of the plurality of base stations in the soft handover state has the shared channel with the above described mobile station set up, the above described method characterized by, in the above described mobile station, measuring receiving SIR (Signal to Interference Ratio) of the above described dedicated channel or the above described common pilot channel transmitted from each of the above described plurality of base stations and notifying the above described specific base station of this measuring results information, and in the above described specific base station, controlling the data transmission of the above described shared channel based on the transmitting power of the above described dedicated channel and the above described measuring results information, and this controlling performed according to the ratio between the sum of the above described receiving SIR and the receiving SIR from the above described specific base station.

According to the present invention, it is possible to acquire the communication control method in the mobile communication system wherein the mobile station and the plurality of base stations in the soft handover state with this mobile station setting up the dedicated channel to the above described mobile station and informing the common pilot channel are included, and only the specific base station of the plurality of base stations in the soft handover state has the shared channel with the above described mobile station set up, the above described method characterized by, in the above described mobile station, measuring the receiving SIR (Signal to Interference Ratio) of the above described dedicated channel or the above described common pilot channel transmitted from each of the above described plurality of base stations and notifying the above described specific base station of this measuring results information, and in the above described specific base station, performing the data transmission of the above described shared channel by the power determined based on the above described measuring results information and the transmitting power of the above described dedicated channel, and the above described determined power being the value according to the ratio between the sum of the above described receiving SIR and the receiving SIR from the above described specific base station.

According to the present invention, it is possible to acquire the specific base station in the mobile communication system wherein the mobile station and the plurality of base stations in the soft handover state with this mobile station setting up the dedicated channel to the above described mobile station and informing the common pilot channel are included, and only the specific base station of the plurality of base stations in the soft handover state has the shared channel with the above described mobile station set up, the above described specific base station characterized by, in response to the notification of the measuring results information in the above described mobile station on the received power of the above described dedicated channel or the above described common pilot channel transmitted from each of the above described plurality of base stations, controlling the data transmission of the above described shared channel based on the transmitting power of the above described dedicated channel and the above described measuring results information, this controlling performed according to the ratio between the sum of the above described received power and the received power from the above described specific base station.

According to the present invention, it is possible to acquire the specific base station in the mobile communication system wherein the mobile station and the plurality of base stations in the soft handover state with this mobile station setting up the dedicated channel to the above described mobile station and informing the common pilot channel are included, and only the specific base station of the plurality of base stations in the soft handover state has the shared channel with the above described mobile station set up, the above described specific base station characterized by, in response to the notification of the measuring results information in the above described mobile station on the received power of the above described dedicated channel or the above described common pilot channel transmitted from each of the above described plurality of base stations, performing the data transmission of the above described shared channel by the power determined based on this measuring results information and the transmitting power of the above described dedicated channel, and the above described determined power being the value according to the ratio between the sum of the above described received power and the received power from the above described specific base station.

According to the present invention, it is possible to acquire the specific base station in the mobile communication system wherein the mobile station and the plurality of base stations in the soft handover state with this mobile station setting up the dedicated channel to the above described mobile station and informing the common pilot channel are included, and only the specific base station of the plurality of base stations in the soft handover state has the shared channel with the above described mobile station set up, the above described specific base station characterized by, in response to the notification of the measuring results information in the above described mobile station on the receiving SIR (Signal to Interference Ratio) of the above described dedicated channel or the above described common pilot channel transmitted from each of the above described plurality of base stations, controlling the data transmission of the above described shared channel based on the transmitting power of the above described dedicated channel and the above described measuring results information, and this controlling performed according to the ratio between the sum of the above described receiving SIR and the receiving SIR from the above described specific base station.

According to the present invention, it is possible to acquire the specific base station in the mobile communication system wherein the mobile station and the plurality of base stations in the soft handover state with this mobile station setting up the dedicated channel to the above described mobile station and informing the common pilot channel are included, and only the specific base station of the plurality of base stations in the soft handover state has the shared channel with the above described mobile station set up, the above described specific base station characterized by, in response to the notification of the measuring results information in the above described mobile station on the receiving SIR (Signal to Interference Ratio) of the above described dedicated channel or the above described common pilot channel transmitted from each of the above described plurality of base stations, performing the data transmission of the above described shared channel by the power determined based on this measuring results information and the transmitting power of the above described dedicated channel, and the above described determined power being the value according to the ratio between the sum of the above described receiving SIR and the receiving SIR from the above described specific base station.

According to the present invention, it is possible to acquire a record medium having recorded a control program of the specific base station in the mobile communication system wherein the mobile station and the plurality of base stations in the soft handover state with this mobile station setting up the dedicated channel to the above described mobile station and informing the common pilot channel are included, and only the specific base station of the plurality of base stations in the soft handover state has the shared channel with the above described mobile station set up, the above described program characterized by, including a process of, in response to the notification of the measuring results information in the above described mobile station on the received power of the above described dedicated channel or the above described common pilot channel transmitted from each of the above described plurality of base stations, controlling the data transmission of the above described shared channel based on the transmitting power of the above described dedicated channel and the above described measuring results information, the above described controlling performed according to the ratio between the sum of the above described received power and the received power from the above described specific base station.

According to the present invention, it is possible to acquire the record medium having recorded the control program of the specific base station in the mobile communication system wherein the mobile station and the plurality of base stations in the soft handover state with this mobile station setting up the dedicated channel to the above described mobile station and informing the common pilot channel are included, and only the specific base station of the plurality of base stations in the soft handover state has the shared channel with the above described mobile station set up, the above described program characterized by, including the process of, in response to the notification of the measuring results information in the above described mobile station on the received power of the above described dedicated channel or the above described common pilot channel transmitted from each of the above described plurality of base stations, performing the data transmission of the above described shared channel by the power determined based on this measuring results information and the transmitting power of the above described dedicated channel, and the above described determined power being the value according to the ratio between the sum of the above described received power and the received power from the above described specific base station.

According to the present invention, it is possible to acquire the record medium having recorded the control program of the specific base station in the mobile communication system wherein the mobile station and the plurality of base stations in the soft handover state with this mobile station setting up the dedicated channel to the mobile station and informing the common pilot channel are included, and only the specific base station of the plurality of base stations in the soft handover state has the shared channel with the above described mobile station set up, the above described program characterized by, including the process of, in response to the notification of the measuring results information in the above described mobile station on the receiving SIR (Signal to Interference Ratio) of the above described dedicated channel or the above described common pilot channel transmitted from each of the above described plurality of base stations, performing the data transmission of the above described shared channel by the power determined based on this measuring results information and the transmitting power of the above described dedicated channel, and the above described determined power being the value according to the ratio between the sum of the above described receiving SIR and the receiving SIR from the above described specific base station.

According to the present invention, it is possible to acquire a communication control method in the mobile communication system wherein the mobile station and the plurality of base stations in the soft handover state with this mobile station setting up the dedicated channel to the above described mobile station and informing the common pilot channel are included, and only the specific base station of the plurality of base stations in the soft handover state has the shared channel with the above described mobile station set up, the above described method characterized by: in the above described mobile station, measuring the received power of the above described dedicated channel or common pilot channel transmitted from each of the above described plurality of base stations and notifying the above described specific base station of these measuring results information, and in the above described specific base station, determining one of the plurality of transmission modes of different modulation or encoding methods based on the above described measuring results information and the transmitting power of the above described dedicated channel, and performing data transmission of the above described shared channel in the determined transmission mode, and the above described transmission mode determined based on the value according to the ratio between the sum of the above described received power and the received power from the above described specific base station.

According to the present invention, it is possible to acquire the communication control method in the mobile communication system wherein the mobile station and the plurality of base stations in the soft handover state with this mobile station setting up the dedicated channel to the above described mobile station and informing the common pilot channel are included, and only the specific base station of the plurality of base stations in the soft handover state has the shared channel with the above described mobile station set up, the above described method characterized by, in the above described mobile station, measuring the receiving SIR (Signal to Interference Ratio) of the above described dedicated channel or the above described common pilot channel transmitted from each of the above described plurality of base stations and notifying the above described specific base station of these measuring results information, and in the above described specific base station, determining one of the plurality of transmission modes of different modulation or encoding methods based on the above described measuring results information and the transmitting data of the above described shared channel in the determined transmission mode, and performing the data transmission of the above described shared channel in the determined transmission mode, and the above described transmission mode determined based on the value according to the ratio between the sum of the above described receiving SIR and the receiving SIR from the above described specific base station.

According to the present invention, it is possible to acquire the specific base station in the mobile communication system wherein the mobile station and the plurality of base stations in the soft handover state with this mobile station setting up the dedicated channel to the above described mobile station and informing the common pilot channel are included, and only the specific base station of the plurality of base stations in the soft handover state has the shared channel with the above described mobile station set up, the above described station characterized by: in response to the notification of the measuring results information in the above described mobile station on the received power of the above described dedicated channel or the above described common pilot channel transmitted from each of the above described plurality of base stations, determining one of the plurality of transmission modes of different modulation or encoding methods based on this measuring results information and the transmitting power of the above described dedicated channel, and performing the data transmission of the above described shared channel in the determined transmission mode, and the above described transmission mode determined based on the value according to the ratio between the sum of the above described received power and the received power from the above described specific base station.

According to the present invention, it is possible to acquire the specific base station in the mobile communication system wherein the mobile station and the plurality of base stations in the soft handover state with this mobile station setting up the dedicated channel to the above described mobile station and informing the common pilot channel are included, and only the specific base station of the plurality of base stations in the soft handover state has the shared channel with the above described mobile station set up, the above described station characterized by, in response to the notification of the measuring results information in the above described mobile station on the receiving SIR (Signal to Interference Ratio) of the above described dedicated channel or common pilot channel transmitted from each of the above described plurality of base stations, determining one of the plurality of transmission modes of different modulation or encoding methods based on this measuring results information and the transmitting power of the above described dedicated channel, and performing the data transmission of the above described shared channel in the determined transmission mode, and the above described transmission mode determined based on the value according to the ratio between the sum of the above described receiving SIR and the receiving SIR from the above described specific base station.

According to the present invention, it is possible to acquire the record medium having recorded the control program of the specific base station in the mobile communication system wherein the mobile station and the plurality of base stations in the soft handover state with this mobile station setting up the dedicated channel to the mobile station and informing the common pilot channel are included, and only the specific base station of the plurality of base stations in the soft handover state has the shared channel with the above described mobile station set up, the above described program characterized by, including the process of, in response to the notification of the measuring results information in the above described mobile station on the received power of the above described dedicated channel or the above described common pilot channel transmitted from each of the above described plurality of base stations, determining one of the plurality of transmission modes of different modulation or encoding methods based on this measuring results information and the transmitting power of the above described dedicated channel, and performing the data transmission of the above described shared channel in the determined transmission mode, and the above described transmission mode determined based on the value according to the ratio between the sum of the above described received power and the received power from the above described specific base station.

According to the present invention, it is possible to acquire the record medium having recorded the control program of the specific base station in the mobile communication system wherein the mobile station and the plurality of base stations in the soft handover state with this mobile station setting up the dedicated channel to the above described mobile station and informing the common pilot channel are included, and only the specific base station of the plurality of base stations in the soft handover state has the shared channel with the above described mobile station set up, the above described program characterized by: including the process of, in response to the notification of the measuring results information in the above described mobile station on the receiving SIR of the above described dedicated channel or common pilot channel transmitted from each of the above described plurality of base stations, determining one of the plurality of transmission modes of different modulation or encoding methods based on this measuring results information and the transmitting power of the above described dedicated channel, and performing the data transmission of the above described shared channel in the determined transmission mode, and the above described transmission mode determined based on the value according to the ratio between the sum of the above described receiving SIR and the receiving SIR from the above described specific base station.

In addition, the above described transmission mode may also be determined based on the value acquired by multiplying the transmitting power of the above described dedicated channel by the ratio between the sum of the above described received power and the received power from the above described specific base station. Moreover, the above described transmission mode may also be determined based on the value acquired by multiplying the transmitting power of the above described dedicated channel by the ratio between the sum of the above described receiving SIR and the receiving SIR from the above described specific base station Workings of the present invention will be described. The mobile station notifies the specific base station (the base station for transmitting a PDSCH) of each of the above measuring results, and the specific base station notified thereof multiplies the transmitting power of a DPCH that is the dedicated channel transmitted by the base station by a coefficient determined based on these measuring results so as to control transmission by using that multiplication value.

To mention it further, when the transmitting power of the dedicated channel is controlled so that receiving quality of the signal of the dedicated channel transmitted from one base station becomes fixed, that transmitting power reflects a propagation loss from the base station to the mobile station and a link state of noise power and interference wave power in the mobile station.

Accordingly, in the case of performing the data transmission by using the shared channel from that base station, it is possible to exert control reflecting the link state by controlling the data transmission according to the transmitting power thereof.

However, when the transmitting power of the dedicated channel is controlled by synthesizing the signals of the dedicated channels transmitted from the plurality of base stations in the mobile station performing the soft handover so that the receiving quality of the synthesized signals becomes fixed, that transmitting power does not correctly reflect the link state from the specific base station to the mobile station for performing the data transmission using the shared channel. It is because the receiving quality of the synthesized signal also depends on the signals from the base stations other than the specific base station.

According to the method of the present invention, it is possible to exert control not only using the transmitting power of the dedicated channel, but also estimating a difference between the receiving quality of the signal from the specific base station and that of the signal wherein the signals from the plurality of base stations including the specific base station are synthesized and reflecting the link state from the specific base station to the mobile station by using the difference.

For that reason, even if the link state changes due to the position of the mobile station, it is possible to maintain the link quality of the data transmission at a fixed level and improve efficiency of the data transmission.

To be more specific, the mobile communication system for controlling the transmitting power of the PDSCH controls the value of the ratio between the transmitting power of the PDSCH and the transmitting power of the DPCH that is the dedicated channel so that it becomes the ratio determined based on the measured values (receiving quality) of the received power and the receiving SIR (Signal to Interference Ratio) of the common channel or the dedicated channel in the mobile station so as to be optimized according to the position of the mobile station on the soft handover in the base station for transmitting the PDSCH that is a large-capacity shared data transmission line.

In addition, the mobile communication system capable of selecting the transmission mode of the PDSCH controls the transmission mode so that the transmitting power per information bit transmitted by the PDSCH is determined based on the measured values (receiving quality) of the received power and the receiving SIR (Signal to Interference Ratio) of the common channel or the dedicated channel in the mobile station so as to be optimized according to the position of the mobile station on the soft handover in the base station for transmitting the PDSCH that is a large-capacity shared data transmission line.

BRIEF DESCRIPTION OF THE DRAWINGS

FIG. 4 is a format diagram of a DPCH that is a dedicated channel;

DETAILED DESCRIPTION OF THE PREFERRED EMBODIMENTS

Figure 1:
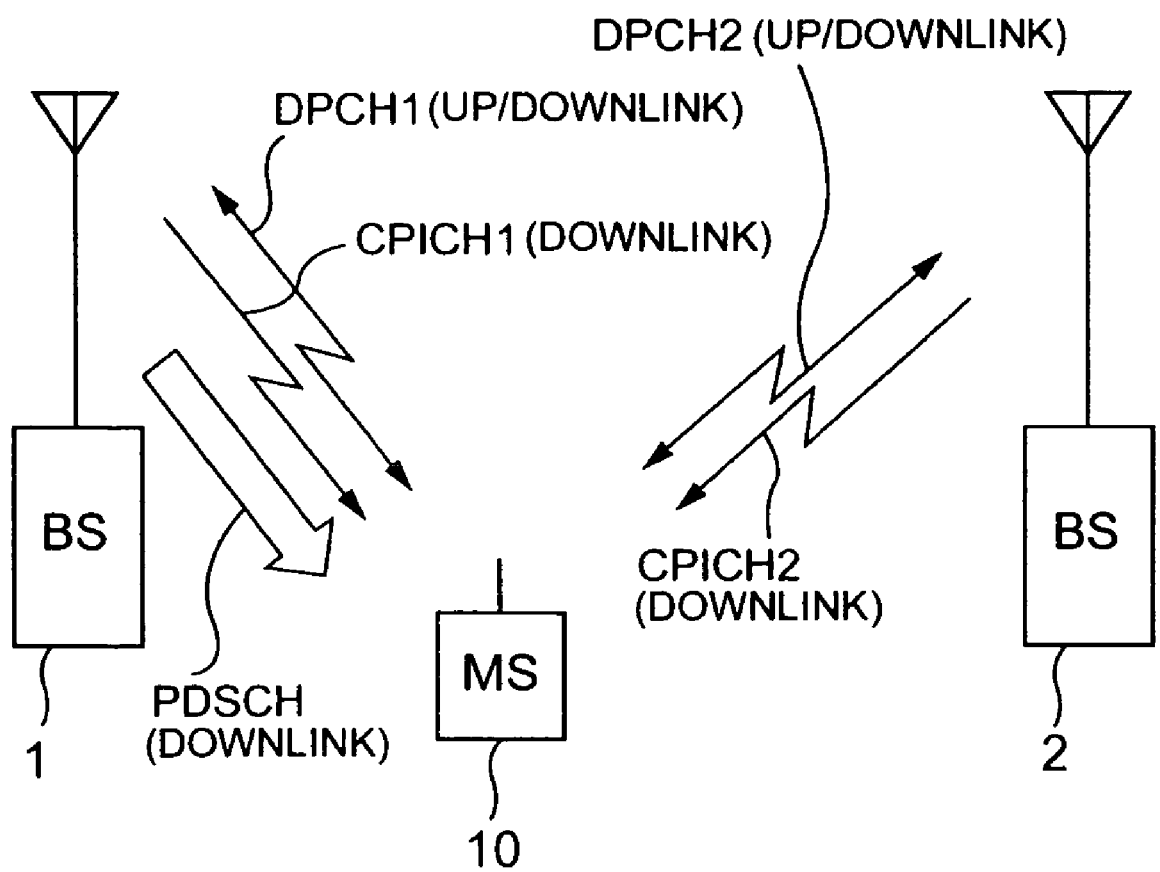
FIG. 1 is an simplified system diagram to which an embodiment of the present invention is applied.

A first embodiment of the present invention will be described hereafter. First, a description will be made as to the case where, in a cellular mobile communication system in an HSDPA mode as shown in FIG. 1, a mobile station 10 is in a soft handover state with base stations 1 and 2, and a PDSCH that is a large-capacity line is set up from the base station 1 to the mobile station 10.

In the present invention, the A of the equation (1) is set as (P1+P2)/P1. Here, P1 and P2 represent received powers of CPICH 1 and CPICH 2 in the mobile station 10 respectively. Accordingly, a transmitting power of the PDSCH in the base station 1 in the present invention is as follows.

$$P_{PDSCH} = P_{DPCH1} \cdot \{(P1+P2)/P1\} \cdot C \qquad (2)$$

Moreover, the C in this case is a predetermined value.

The transmitting power of the PDSCH is determined by a relation satisfying this equation (2) so that the receiving quality of the PDSCH in the mobile station 10 will be maintained at a fixed level regardless of a position of the mobile station 10 on the soft handover. It will be proved hereafter.

Now, if a propagation loss from the base station 1 to the mobile station 10 is L1, the propagation loss from the base station 2 to the mobile station 10 is L2, and an interference wave (disturbing wave) is I, a ratio between a signal transmitted from the base station 1 in the relation of the equation (2) and interference wave power is as follows in the mobile station 10.

$$\frac{P_{PDSCH}}{L_1 \cdot I} = \frac{P_{DPCH1}}{L_1 \cdot I} \cdot \frac{P_1 + P_2}{P_1} \cdot C \qquad (3)$$

In the equation (3), if $P_{PDSCH}/L_1$ is $S_{PDSCH}$, and $P_{DPCH1}/L_1$ is $S_1$, it will be as follows.

$$\frac{S_{PDSCH}}{I} = \frac{S_1}{I} \cdot \frac{P_1 + P_2}{P_1} \cdot C \qquad (4)$$

Now, the transmitting powers of a DPCH 1 and a DPCH 2 in the base stations are controlled by a high-speed power control loop so that the receiving quality of the signals after synthesis becomes fixed. To be more specific, the mobile station synthesizes the signals of the DPCH 1 and the DPCH 2 and compares the receiving quality of the synthesized signals to a fixed desired value, and according to the results thereof, it notifies the base station of a command for giving an instruction for increasing or decreasing the transmitting powers, so that each base station increases or decreases the transmitting power of the DPCH 1 and the DPCH 2 according to the notification. Each base station renders initial values of the transmitting powers fixed, and increases or decreases the transmitting powers according to the same command from the mobile station, and so both the transmitting powers are balanced and accordingly transmitting powers $P_{d1}$ and $P_{d2}$ are equal as follows.

$$P_{d1} = P_{d2} = P_d \qquad (5)$$

In addition, transmitting powers $P_{C1}$ and $P_{C2}$ of the CPICH 1 and the CPICH 2 are fixed, and a transmitting power ratio of CPICH/DPCH in the base station 1 and 2 are mutually equal.

Accordingly, it is as follows.

$$P_{c1}/P_{d1} = P_{c2}/P_{d2} \qquad (6)$$

And from the equation (5), it is as follows.

$$P_{c1}/P_d = P_{c2}/P_d \qquad (7)$$

And so it is as follows.

$$P_{c1} = P_{c2} \ (P_c) \qquad (8)$$

Accordingly, the equation (4) can be rewritten as follows.

$$\frac{S_{PDSCH}}{I} = \frac{S_1}{I} \cdot \frac{\frac{P_c}{L_1} + \frac{P_c}{L_2}}{\frac{P_C}{L_1}} \cdot C \qquad (9)$$

$$= \frac{S_1}{I} \cdot \frac{\frac{1}{L_1} + \frac{1}{L_2}}{\frac{1}{L_1}} \cdot C$$

$$= \frac{S_1}{I} \cdot \frac{\frac{P_d}{L_1} + \frac{P_d}{L_2}}{\frac{P_d}{L_1}} \cdot C$$

Furthermore, if the equation (9) is rewritten by using the equation (5), the following can be acquired.

$$\frac{S_{PDSCH}}{I} = \frac{S_1}{I} \cdot \frac{\frac{P_{d1}}{L_1} + \frac{P_{d2}}{L_2}}{\frac{P_{d1}}{L_1}} \cdot C \quad (10)$$

$$= \frac{S_1}{I} \cdot \frac{S_1 + S_2}{S_1} \cdot C$$

$$= \frac{S_1}{I} \cdot \frac{\frac{S_1}{I} + \frac{S_2}{I}}{\frac{S_1}{I}} \cdot C$$

$$= \left(\frac{S_1}{I} + \frac{S_2}{I}\right) \cdot C$$

The inside of the parenthesis on the right side of the equation (10) is a sum of signal to interference ratios of receiving signals of the DPCH 1 and the DPCH 2, representing the signal to interference ratio of the signals after synthesizing the receiving signals at a maximum ratio, that is, the receiving quality of the synthesized signals, which is kept fixed by the high-speed power control loop so that, as revealed, the receiving quality of the PDSCH in the mobile station shown in the equation (3) consequently becomes fixed.

Accordingly, the received powers P1 and P2 of the CPICH 1 and the CPICH 2 of the base station 1 and 2 in the soft handover relation should be measured in the mobile station 10 with the measuring results notified to the base station 1, where the P1 and P2 should be used to calculate the transmitting power of the PDSCH from the equation (2) so as to transmit data to the large-capacity line.

While the received powers of the CPICH 1 and the CPICH 2 are measured in the mobile station 10 in the above example, it is also feasible to measure the received powers of individual pilot signals of the DPCH 1 and the DPCH 2 instead and use them as the above P1 and P2. In this case, the equation in the second line of the equation (10) is immediately acquired from the equation (4) and the equation in the last line of the equation (10) also follows, so that the effect exactly the same as using the received power of the CPICH can be obtained.

Moreover, while the condition shown in the equation (5), that is, the condition that the transmitting powers $P_{d1}$ and $P_{d2}$ of the DPCH 1 and the DPCH 2 are equal is required in the case of using the received powers of the CPICH, the equation (10) holds without the above condition in the case of using the DPCH.

While the mobile station 10 notifies the base station 1 of the received power measured values P1 and P2, it may also notify P2/P1, P1/P2, (P1+P2)/P1, P1/(P1+P2) and so on or an average thereof in a section of a predetermined number of frames. Furthermore, it is also feasible to receive the P1 and P2 on the base station side to calculate and average the above values.

Furthermore, it is also possible to use the value of A by raising it to the α th power, in which case it is equivalent to multiplying a decibel value by an integer. In addition, it is also possible to set upper and lower limits to the A.

Figure 2:
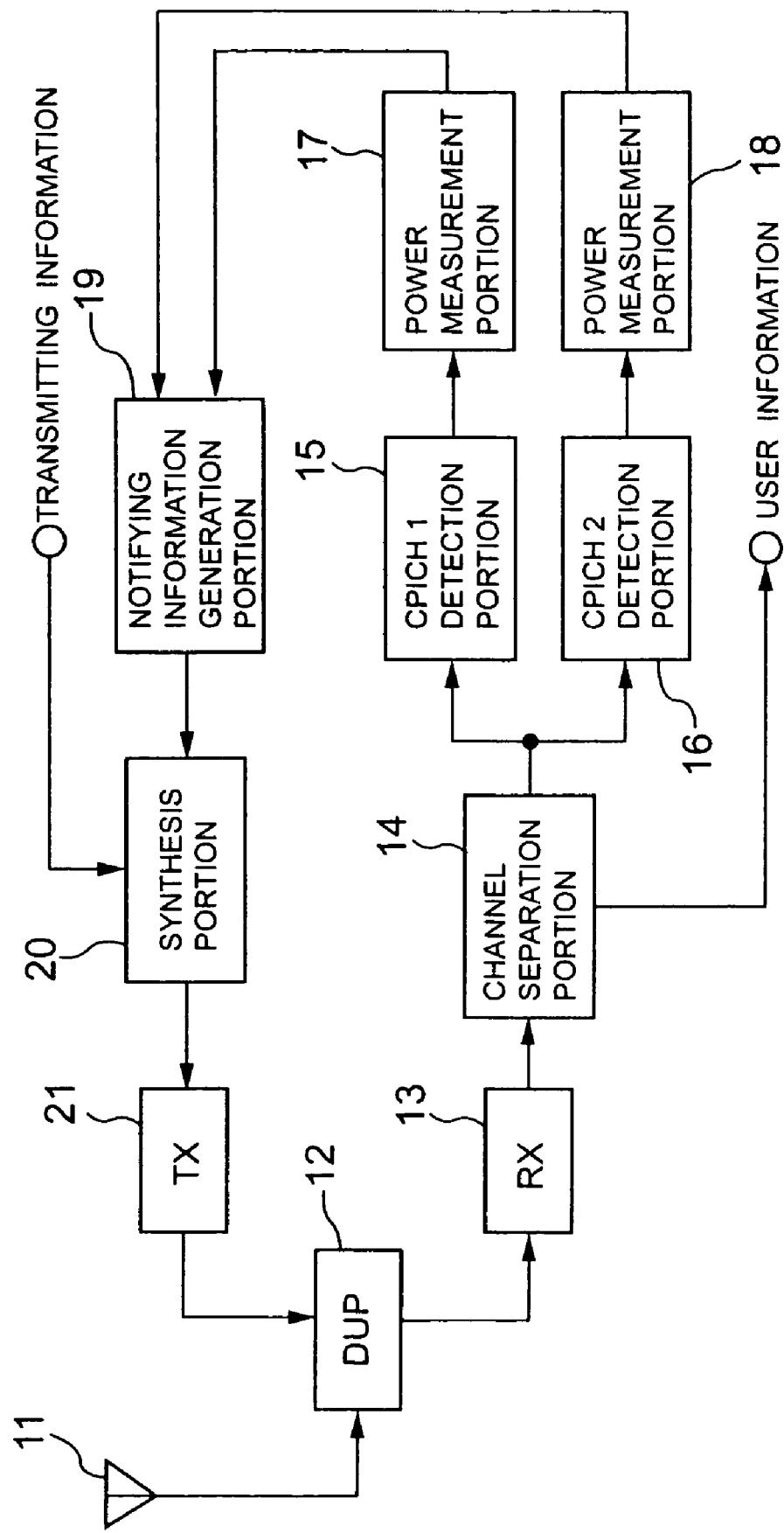
FIG. 2 is a block diagram showing the embodiment of a mobile station of the present invention.
Figure 3:
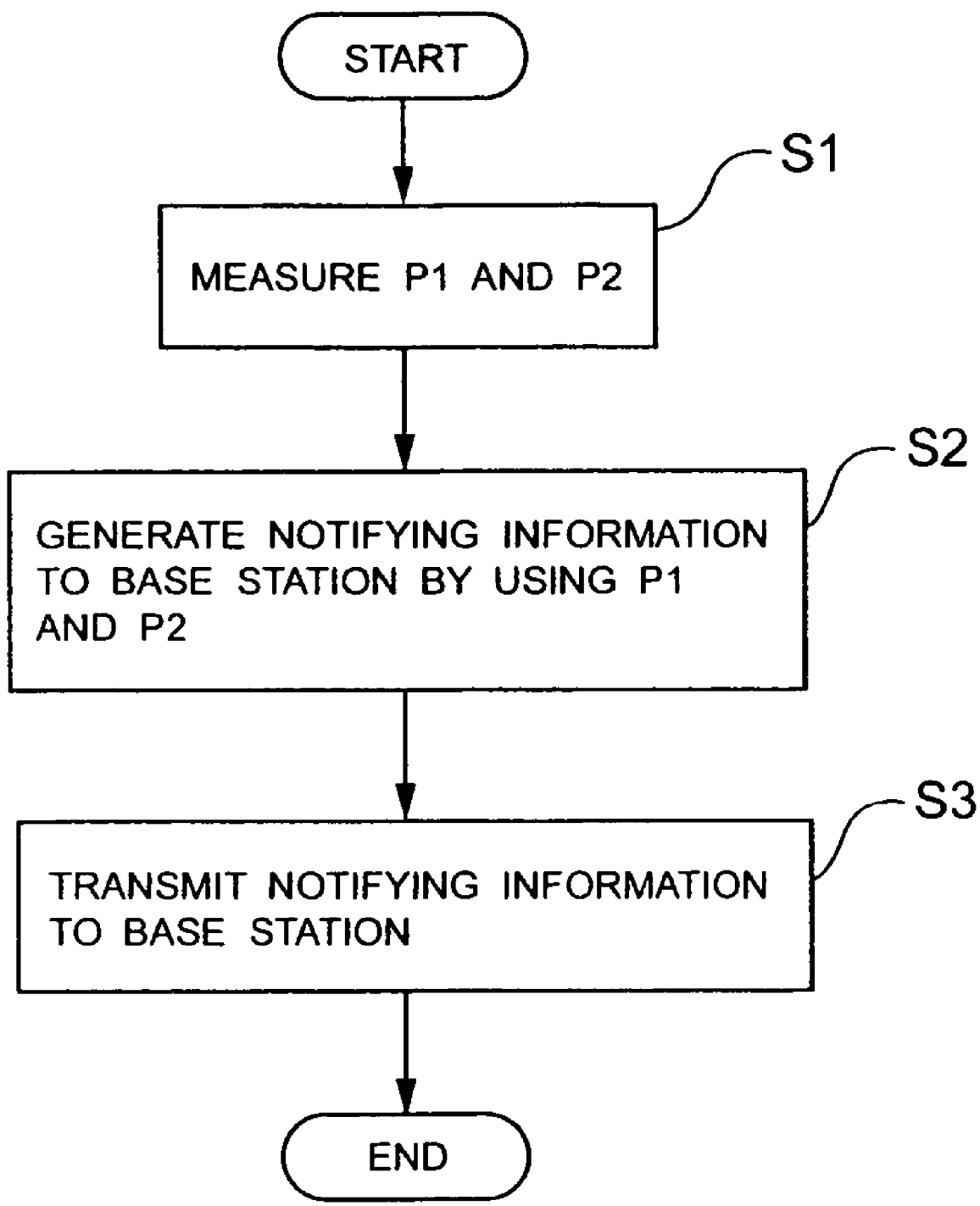
FIG. 3 is a flowchart showing operation of the mobile station in FIG. 2.

FIG. 2 is a block diagram of the embodiment of the mobile station of the present invention, and FIG. 3 is a simplified operation flowchart thereof. A received wave from an antenna 11 is supplied to a reception portion 13 via a duplexer (DUP) 12 and is demodulated. The demodulation output is separated into user information and control information by a channel separation portion 14. Among the control information, common pilot channels CPICHs are detected by detection portions 15 and 16 respectively, and the received powers P1 and P2 are measured in power measurement portions 17 and 18 (step S1).

These measured values P1 and P2 are supplied to a notifying information generation portion 19, where notifying information to the base station 1 is generated (step S2). This notifying information generation portion 19 generates any one of the ratio between the sum of the received powers of the signals from the plurality of base stations 1 and 2 and the received power of the signals from a specific base station, the ratio between the sum of the received powers of the signals from the plurality of base stations except the specific base station and the received power of the signals from the specific base station, and inverse numbers of these ratios. To be more specific, it generates P1/P2, P2/P1, (P1+P2)/P1, P1/(P1+P2) or the average values of these several frames as the notifying information based on the measured values P1 and P2. This notifying information is synthesized with transmitting information in a synthesis portion 20, and is applied to a transmission portion 21 to be modulated so that it is transmitted to the base station 1 via the DUP 12 (step S3).

The notifying information at this time is transmitted by using an uplink of the DPCH 1. FIG. 4 shows a format of the DPCH, where the uplink and downlink are different. The uplink DPCH is comprised of a DPCCH (Dedicated Physical Control Channel) and a DPDCH (Dedicated Physical Data Channel), and they are orthogonally modulated mutually. The DPCCH has pilot signals (dedicated), transmission power control information (TPC), feedback information (FBI) and communication data. While this FBI includes a CW (code word: specifying a primary base station) used for SSDT (site selection diversity transmission: a mode wherein only the base station having the highest (primary) received power of the CPICH in the mobile station performs data transmission), the system of the present invention does not adopt the SSDT mode so that this CW portion may be used for the above-mentioned notifying information. In addition, it is a matter of course that another available bit may be used.

Figure 5:
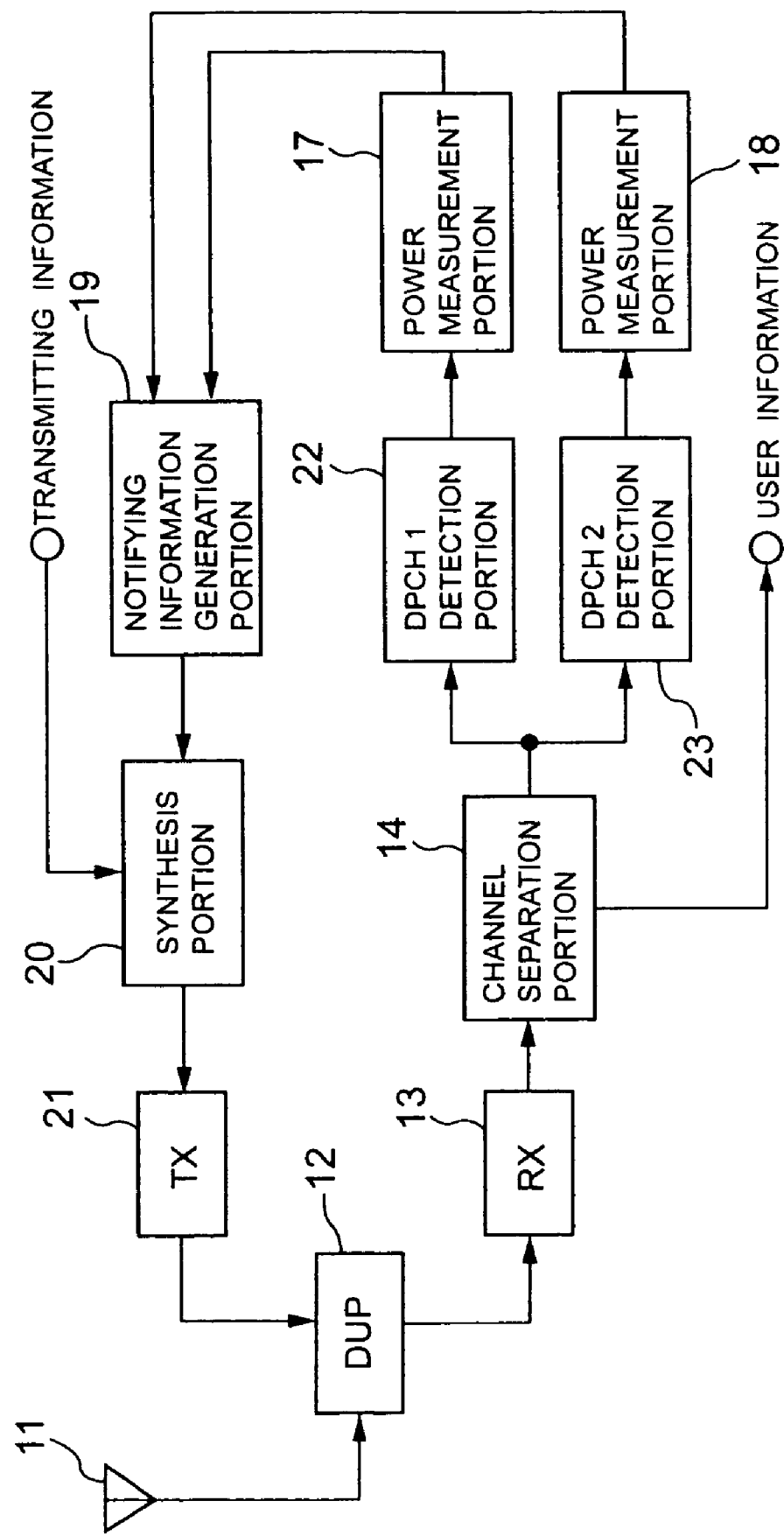
FIG. 5 is a block diagram showing another embodiment of the mobile station of the present invention.

FIG. 5 is a block diagram of another embodiment of the mobile station of the present invention, and the portions equal to those in FIG. 2 are indicated by the same symbols. In this example, the DPCH is measured instead of the CPICH, and so the only difference is that the portions 15 and 16 for measuring the CPICH in FIG. 2 are the portions 22 and 23 for measuring the DPCH.

Figure 6:
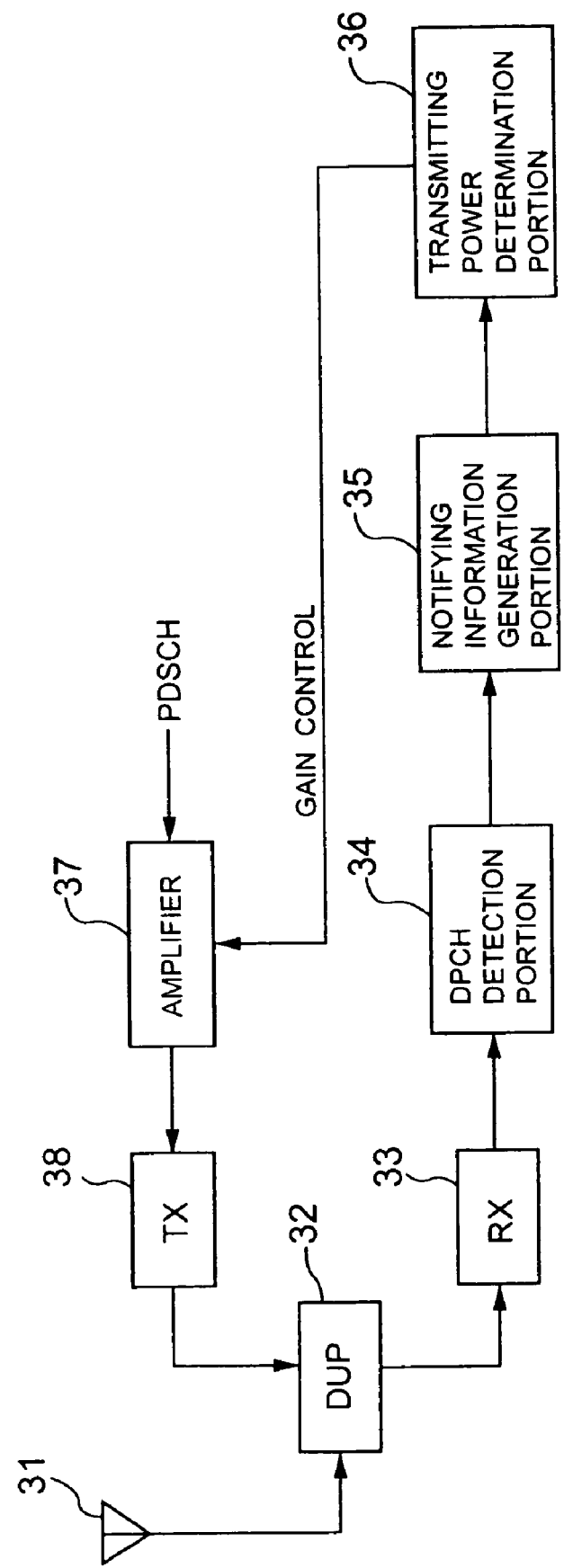
FIG. 6 is a block diagram showing the embodiment of a base station of the present invention.
Figure 7:
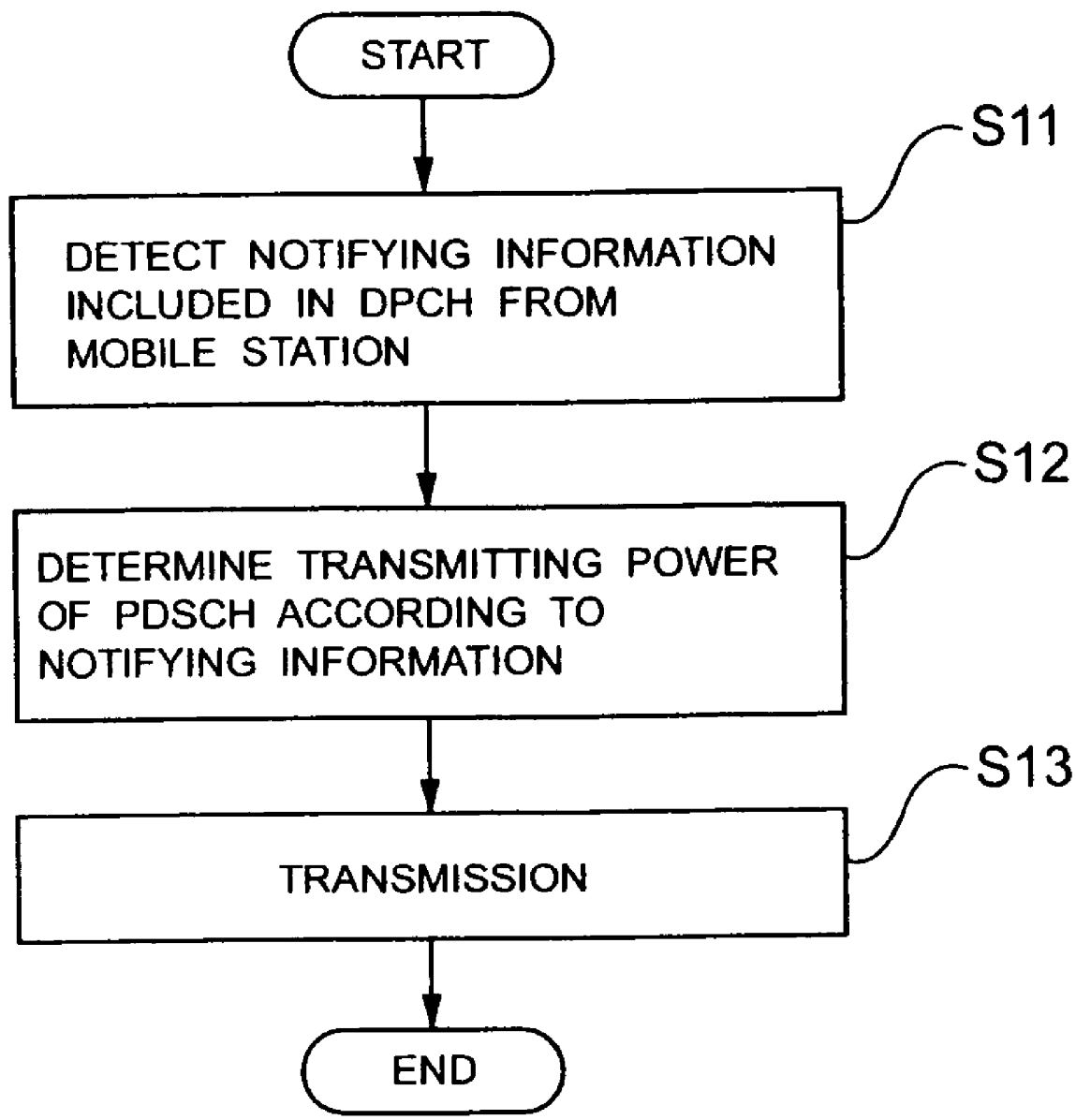
FIG. 7 is a flowchart representing the operation of the base station in FIG. 6.

FIG. 6 is a block diagram of the embodiment of the base station of the present invention, and FIG. 7 is a rough operation flowchart thereof. The received wave from an antenna 31 is inputted to a reception portion 33 via a DUP 32 and is demodulated. As for demodulation output, the DPCH is detected in a DPCH detection portion 34, and the notifying information from the mobile station included therein is detected by a notifying information detection portion 35 (step S11).

This notifying information is inputted to a transmitting power determination portion 36 and controls gain of a transmission amplifier 37 so that the transmitting power of the PDSCH becomes the equation (2). To be more specific, a multiplication coefficient (P1+P2)/P1 for the transmitting power of the DPCH not shown is generated, and control is performed by multiplying the transmitting power of the DPCH by this coefficient (step S12), and it is modulated by a transmission portion 38 so that the PDSCH is transmitted to the mobile station (step S13). Moreover, the CPICH and the DPCH are omitted in FIG. 6.

While a control amount of the transmitting power is determined by using the received powers of the CPICH and the DPCH in the mobile station in the above-mentioned embodiment, it can be implemented just in the same way by using a SIR (Signal to Interference Ratio) of the CPICH and the DPCH.

In addition, while a description was made as to the case where the number of the base stations on the soft handover is two, it applies likewise to the cases where it is three or more, in which cases the value (coefficient) of the A in the equation (2) is (P1+P2+P3+ . . . )/P1.

It is evident that the flow in FIG. 7 for controlling operation of the base station can be implemented by recording a program on a record medium and reading it to control the operation of hardware (a computer).

In the above embodiment, while an example of controlling the transmitting power is shown as a method of controlling the data transmission by using a shared channel, there is also the method of controlling the data transmission wherein a modulation method or an encoding method is changed according to a link state while maintaining a fixed transmitting power, and the present invention is also applicable to such control.

Furthermore, another embodiment (a second embodiment) of the present invention will be described. As in the embodiment described earlier, a description will be made as to the case where, in the cellular mobile communication system in the HSDPA mode as shown in FIG. 1, the mobile station 10 is in the soft handover state with base stations 1 and 2, and the PDSCH that is the large-capacity line is set up from the base station 1 to the mobile station 10. The base station 1 transmits the CPICH 1 and the PDSCH, and transmits and receives the DPCH 1 to and from the mobile station 10, and the base station 2 transmits the CPICH 2, and transmits and receives the DPCH 2 to and from the mobile station 10. In addition, it is the same as the embodiment described earlier in that the mobile station 10 measures the received powers P1 and P2 of the CPICH 1 and the CPICH 2 respectively and notifies the base stations of the information thereon, and in that the transmitting power of the downlink DPCH is controlled by the command notified by the mobile station for giving the instruction for increasing or decreasing the transmitting power.

In the mobile communication system of the second embodiment, it is possible to select a plurality of transmission modes using modulation methods such as QPSK (Quadrature Phase Shift Keying) capable of transmitting 2 bits (4 values) by 1 symbol, 16QAM (16 Quadrature Amplitude Modulation) capable of transmitting 4 bits (16 values) by 1 symbol, 64QAM (64 Quadrature Amplitude Modulation) capable of transmitting 6 bits (64 values) by 1 symbol and so on. The number of symbols to be transmitted per second is fixed regardless of the transmission mode. A determination of switching the above transmission modes is made by the base station 1. While these transmission modes may have encoding rates with different encoding methods, it is fixed here as the encoding rate of 1/3 for instance in order to simplify the description.

On determination of switching the above transmission modes, the base station notifies the mobile station 2 by using the downlink (DL) DPCH (Dedicated Physical Channel), and switches the transmission modes in predetermined timing after the notification thereof, and the mobile station 2 switches the reception modes in the same timing to receive the PDSCH transmitted by the base station.

Figure 10:
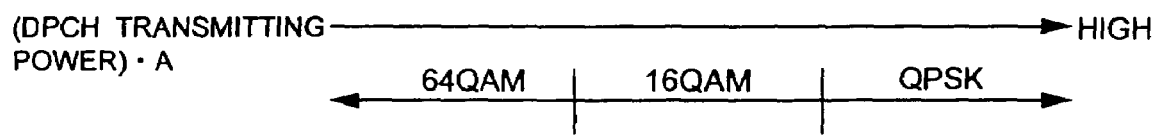
FIG. 10 is a diagram showing an example of the operation of transmission mode selection in the second embodiment.
Figure 11:
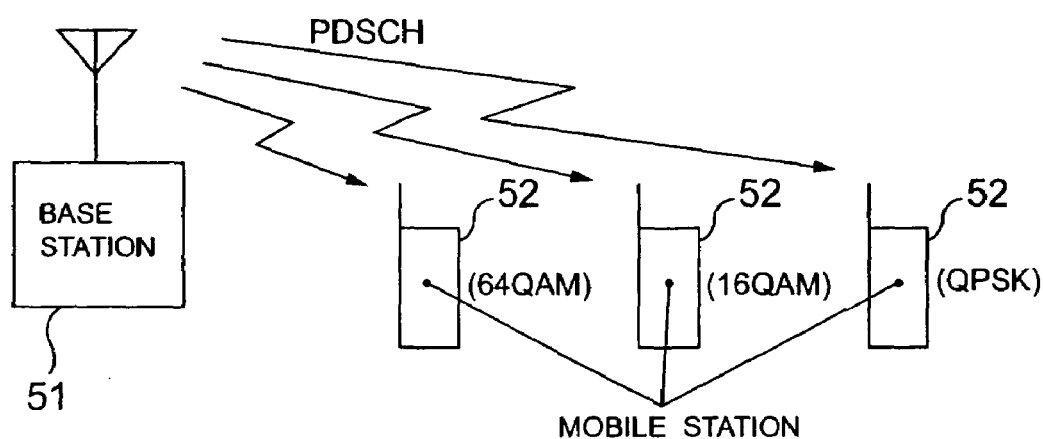
FIG. 11 is a diagram showing a concept of the transmission mode selection in the conventional example.
Figure 12:
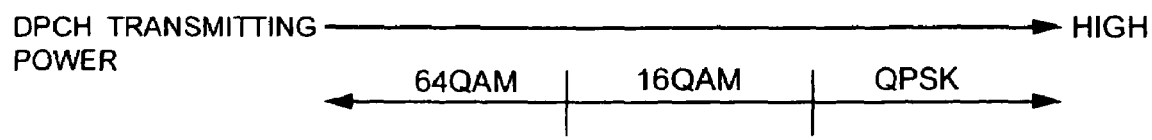
FIG. 12 is a diagram showing an conventional example of the operation of the transmission mode selection.

In the determination of the transmission mode, the base station selects the transmission mode using the modulation method according to largeness of the multiplication value calculated by multiplying the transmitting power $P_{DPCH1}$ by the coefficient A as shown in FIG. 10. Here, the coefficient A is set as (P1+P2)/P1. This coefficient A is the same as coefficient A in the preceding embodiment.

In FIG. 10, the larger each threshold is, the easier it becomes to use multi-valued modulation such as 64QAM resulting in a higher bit error rate, so that the threshold of an upper limit of the multiplication value using the 64QAM, for instance, is set at the value wherein, when the multiplication value is equal to the threshold of the upper limit of the 64QAM, the bit error rate nearly becomes the desired value at the 64QAM. In addition, the threshold of an upper limit of the multiplication value using the 16QAM is also set likewise at the value wherein the bit error rate nearly becomes the desired value for the 16QAM when the multiplication value is equal to the threshold of the upper limit of the 16QAM. Moreover, it is relatively easy to determine the thresholds by performing it on condition of A=1 without performing the soft handover since it is not necessary to calculate the value of the A.

Thus, transmission mode power of the PDSCH is determined by the largeness of the multiplication value so that the receiving quality of the PDSCH in the mobile station 10 is maintained nearly at a fixed level regardless of the position of the mobile station 10 on the soft handover. The reason for this will be described hereafter.

In general, it is possible to render the error rate of an information bit as the desired value by maintaining the ratio between a received power per information bit Eb and a noise power including an interference power No (Eb/No) nearly at a predetermined value. As this embodiment has the encoding rate of the transmission modes fixed, and it also has the transmitting power fixed, that is the transmitting power per symbol fixed, the received power per bit at the 16QAM of 4 bits by 1 symbol is 1/2, and the received power per bit at the 64QAM of 6 bits by 1 symbol is 1/3 if a propagation path is fixed, compared with the case of selecting the QPSK of 2 bits by 1 symbol.

Accordingly, if the propagation path is fixed, the Eb/No per bit is 1/2 at the 16QAM and it is 1/3 at the 64QAM compared with the case of selecting the QPSK.

Here, the case where only one base station is transmitting the DPCH to the mobile station is considered first. The transmitting power of the downlink DPCH is controlled so that the receiving quality of the DPCH in the mobile station becomes fixed. In addition, the propagation paths of the DPCH and the PDSCH are the same. For this reason, when the state of the propagation path of the PDSCH changes and the transmitting power of the DPCH becomes 1/2 or 1/3 of the transmitting power of a certain criterion, the Eb and No of the PDSCH becomes twice or three times thereof respectively if the transmission mode remains fixed. Moreover, causes of this change of the condition of the propagation paths include decrease in the propagation loss and the decrease in the noise power including the interference power.

Accordingly, if the 16QAM or the 64QAM is selected as the transmitting power of the DPCH becomes 1/2 and 1/3 when using the QPSK at the transmitting power of a certain criterion, it results in increasing an improvement of the Eb/No due to the change by the number of bits per symbol even if the state of the propagation path changes, leading to maintaining the Eb/No nearly at a fixed level with no increase therein and also keeping the bit error rate nearly fixed.

Next, the case where the two base stations 1 and 2 are transmitting the DPCHs to the mobile station 10. The transmitting powers of the DPCH 1 and the DPCH 2 are balanced, and these receiving signals are synthesized at a maximum ratio in the mobile station. In addition, the transmitting power ratio of the CPICH and the DPCH in the base stations 1 and 2 are mutually equal. At this time, if the transmitting power of the DPCH is k times as much as that of the CPICH, the received power of the DPCH 1 is kP1 and the received power of the DPCH 2 is kP2, and so the received power of the DPCH 1 and the DPCH 2 after the synthesis is kP1+kP2.

Accordingly, even if the base station 2 transmits the DPCH 2 to the mobile station, the received power becomes (P1+P2)/P1 times as much as the received power kP1 in the case of only the DPCH 1 unless the transmitting power of the DPCH 1 is changed. However, as the transmitting power is controlled so that the receiving quality of the DPCHs after the synthesis becomes fixed, the transmitting powers of the DPCH 1 and the DPCH 2 become P1/(P1+P2) times as compared with the case where the DPCH 2 is not transmitted.

Accordingly, the transmitting power in the case where only one base station transmits the DPCH is acquired by multiplying by (P1+P2)/P1 the transmitting power in the case where two base stations transmit the DPCHs. In the present invention, this (P1+P2)/P1 is used as the coefficient A to multiply the transmitting power of the DPCH thereby, and the transmission mode is determined based on that multiplication value so that, even in the case of performing the soft handover, the transmission mode not affected thereby, maintaining the Eb/No nearly at the fixed level and keeping the bit error rate nearly fixed is selected.

Accordingly, in the mobile station 10, the received powers P1 and P2 of the CPICH 1 and the CPICH 2 of the base station 1 and 2 in the soft handover relation should be measured with the measuring results notified to the base station 1, where the P1 and P2 should be used to determine the transmission mode of the PDSCH so as to transmit data to the large-capacity line.

While the mobile station 10 notifies the base station 1 of the received power measured values P1 and P2, it may also notify P2/P1, P1/P2, (P1+P2)/P1, P1/(P1+P2) and so on or an average thereof in the section of the predetermined number of frames. Furthermore, it is also feasible to receive the P1 and P2 on the base station side to calculate and average the above values. Furthermore, it is also possible to use the value of A by raising it to the α th power, in which case it is equivalent to multiplying the decibel value by the integer. In addition, it is also possible to set the upper and lower limits to the A.

While the mobile station requires a function of receiving the plurality of transmission modes in a receiver thereof, it is the same as the first embodiment otherwise and the method of transmitting the notifying information from the mobile station to the base station is also the same, and so the description thereof is omitted.

Figure 8:
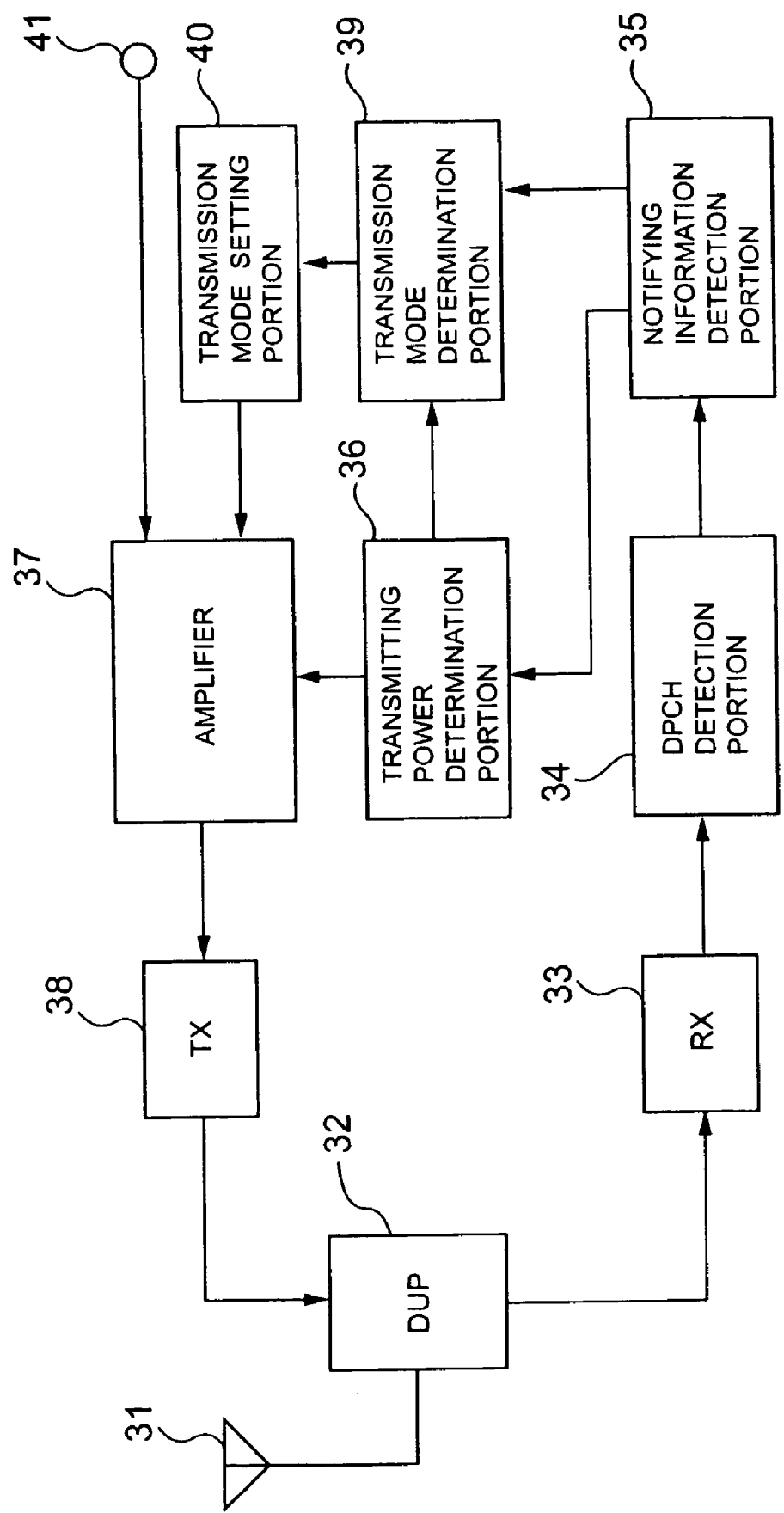
FIG. 8 is a block diagram showing the embodiment of the base station in the second embodiment of the present invention.
Figure 9:
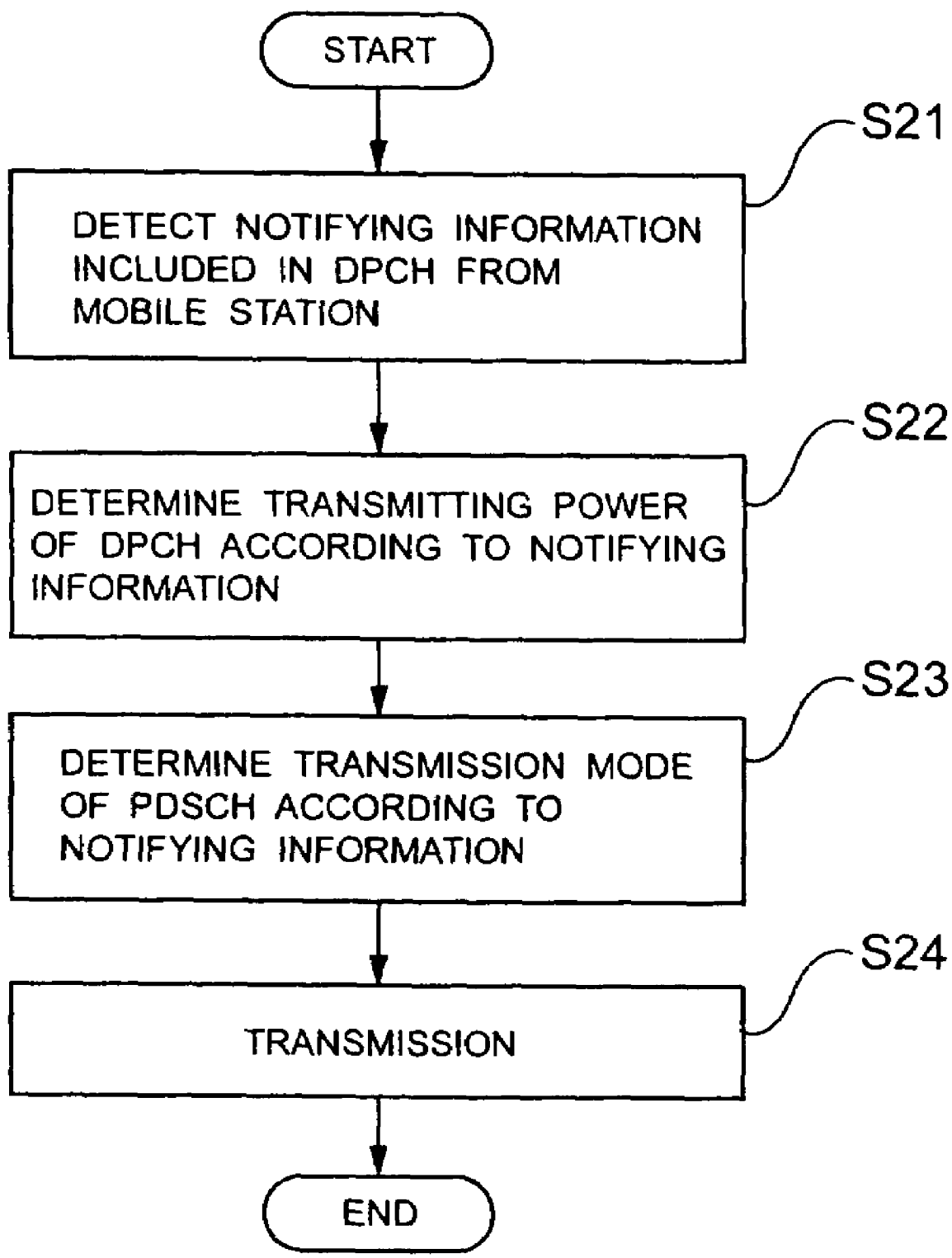
FIG. 9 is a flowchart representing the operation of the base station in FIG. 8.

FIG. 8 is a block diagram of the embodiment of the base station of the present invention, and FIG. 9 is a rough operation flowchart thereof. The receiving signal from the antenna 31 is inputted to the reception portion 33 via the duplexer DUP 32 and is demodulated. As for the demodulation output, the DPCH is detected in the DPCH detection portion 34, and the notifying information from the mobile station included therein is detected by the notifying information detection portion 35 (step S21).

This notifying information is inputted to the transmitting power determination portion 36, and the transmitting power of the downlink DPCH is determined according to the command giving the instruction for increasing or decreasing the transmitting power so as to control the gain of the transmission amplifier 37 by the determined transmitting power (step S22). In addition, the determined transmitting power is inputted to a transmission mode determination portion 39, and on the other hand, the information on the received powers of the CPICH 1 and the CPICH 2 in the mobile station 10 included in the notifying information detected by the notifying information detection portion 35 is also inputted to the transmission mode determination portion 39.

And the transmission mode determination portion 39 determines the transmission mode of a transmission mode setting portion 40 based on such input information so that the Eb/No in the mobile station becomes nearly fixed. To be more specific, the multiplication coefficient A that is (P1+P2)/P1 for the transmitting power of the DPCH is generated and control is exerted to multiply the transmitting power of the DPCH by this coefficient so that, as shown in FIG. 10, the transmission mode corresponding to the modulation method is determined according to the largeness of that multiplication value (step S23), and the PDSCH is modulated in the transmission mode determined by the transmission portion 38 and transmitted to the mobile station, and the DPCH amplified by the transmission amplifier 37 is also transmitted to the mobile station (step S24).

Moreover, in FIG. 8, reference numeral 41 denotes transmission information, and the CPICH is omitted. In addition, it is evident here that, instead of multiplying the transmitting power by the coefficient, the decibel values of the transmitting power and that of the coefficient may be calculated to get the sum thereof.

While the transmission mode is determined by using the received powers of the CPICH and the DPCH in the mobile station in the embodiment described above, it can be implemented just in the same way by using the SIR (Signal to Interference Ratio) of the CPICH and the DPCH. In addition, while a description was made as to the case where the modulation method is different according to the transmission mode, it can also be implemented just in the same way in the case where the encoding method is different according to the transmission mode.

In addition, while a description was made as to the case where the number of the base stations on the soft handover is two, it also applies likewise to the cases where it is three or more, in which cases the value (coefficient) of the A is (P1+P2+P3+ . . . )/P1.

It is evident that the flow in FIG. 9 for controlling the operation of the base station can be implemented by recording the program on the record medium and reading it to control the operation of the hardware (computer).

As described above, according to the present invention, the received powers and the receiving SIR of the CPICH and the DPCH from the base station in the soft handover state with the mobile station are measured on the soft handover, which are notified to the base station, and the notified base station determines the transmitting power or the transmission mode of the shared channel based on these measured values, so that it is possible to perform data transmission by the PDSCH of the constantly fixed quality regardless of the position of the mobile station, and so it has the effect of improving efficiency of the data transmission.

What is claimed is:

1. A communication control method in a mobile communication system wherein a mobile station and a plurality of base stations in a soft handover state with said mobile station setting up a dedicated channel to said mobile station and informing a common pilot channel are included, and only a specific base station of the plurality of base stations in the soft handover state has a shared channel with said mobile station set up, said method comprising:

in said mobile station, measuring received power of said dedicated channel or common pilot channel transmitted from each of said plurality of base stations and notifying said specific base station of these measuring results information; and in said specific base station, controlling data transmission of said shared channel based on a transmitting power of said dedicated channel and said measuring results information, said controlling being performed according to a ratio between a sum of said received power and the received power from said specific base station.

2. A communication control method in a mobile communication system wherein a mobile station and a plurality of base stations in a soft handover state with said mobile station setting up a dedicated channel to said mobile station and informing a common pilot channel are included, and only a specific base station of the plurality of base stations in the soft handover state has a shared channel with said mobile station set up, said method comprising:

in said mobile station, measuring received power of said dedicated channel or common pilot channel transmitted from each of said plurality of base stations and notifying said specific base station of these measuring results information; and in said specific base station, performing data transmission of said shared channel by a power determined based on said measuring results information and a transmitting power of said dedicated channel, said determined power being a value according to a ratio between a sum of said received power and the received power from said specific base station.

3. The communication control method according to claim 2, wherein said determined power is a value acquired by multiplying the transmitting power of said dedicated channel by the ratio between the sum of said received power and the received power from said specific base station.

4. A specific base station in a mobile communication system wherein a mobile station and a plurality of base stations in a soft handover state with said mobile station setting up a dedicated channel to said mobile station and informing a common pilot channel are included, and only a specific base station of the plurality of base stations in the soft handover state has a shared channel with said mobile station set up, wherein said station, in response to notification of measuring results information in said mobile station on a received power of said dedicated channel or said common pilot channel transmitted from each of said plurality of base stations, controlling data transmission of said shared channel based on transmitting power of said dedicated channel and said measuring results information, and said controlling is performed according to a ratio between a sum of said received power and the received power from said specific base station.

5. A specific base station in a mobile communication system wherein a mobile station and a plurality of base stations in a soft handover state with said mobile station setting up a dedicated channel to said mobile station and informing a common pilot channel are included, and only the specific base station of the plurality of base stations in the soft handover state has a shared channel with said mobile station set up, wherein said specific base station, in response to notification of measuring results information in said mobile station on a received power of said dedicated channel or said common pilot channel transmitted from each of said plurality of base stations, performs data transmission of said shared channel by a power determined based on said measuring results information and a transmitting power of said dedicated channel, and said determined power is a value according to a ratio between a sum of said received power and the received power from said specific base station.

6. The base station according to claim 5, wherein said determined power is a value acquired by multiplying the transmitting power of said dedicated channel by the ratio between the sum of said received power and the received power from said specific base station.

7. A record medium having recorded a control program of a specific base station in a mobile communication system wherein a mobile station and a plurality of base stations in a soft handover state with said mobile station setting up a dedicated channel to said mobile station and informing a common pilot channel are included, and only a specific base station of the plurality of base stations in the soft handover state has a shared channel with said mobile station set up, said program including a process of:

in response to notification of measuring results information in said mobile station on a received power of said dedicated channel or said common pilot channel transmitted from each of said plurality of base stations, controlling data transmission of said shared channel based on transmitting power of said dedicated channel and said measuring results information, said controlling being performed according to a ratio between a sum of said received power and the received power from said specific base station.

8. A record medium having recorded a control program of a specific base station in a mobile communication system wherein a mobile station and a plurality of base stations in a soft handover state with said mobile station setting up a dedicated channel to said mobile station and informing a common pilot channel are included, and only a specific base station of the plurality of base stations in the soft handover state has a shared channel with said mobile station set up, said program including a process of:

in response to notification of measuring results information in said mobile station on a received power of said dedicated channel or said common pilot channel transmitted from each of said plurality of base stations, performing data transmission of said shared channel by a power determined based on said measuring results information and a transmitting power of said dedicated channel, said determined power being a value according to a ratio between a sum of said received power and the received power from said specific base station.

* * * * *